(No Model.)
W. F. LILL.
BALL COCK.
No. 500,265. Patented June 27, 1893.
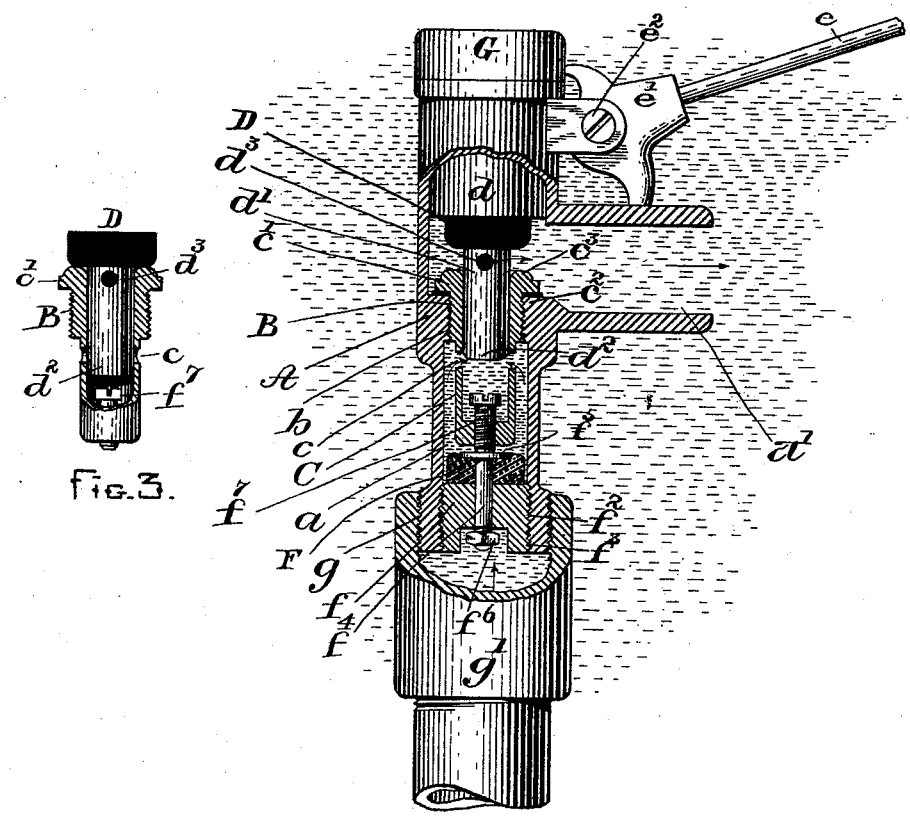
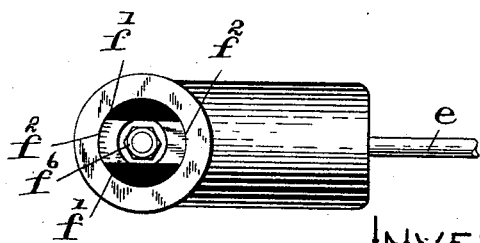
WITNESSES.
J. M. Dolan
M. Lynch
INVENTOR
William F. Lill
by his Attorney
Charles L. Raymond

UNITED STATES PATENT OFFICE.

WILLIAM F. LILL, OF NEWTON, MASSACHUSETTS.

BALL-COCK.

SPECIFICATION forming part of Letters Patent No. 500,265, dated June 27, 1893.

Application filed January 3, 1893. Serial No. 457,063. (No model.)

*To all whom it may concern:*

Be it known that I, WILLIAM F. LILL, a citizen of the United States, residing at Newton, in the county of Middlesex and State of Massachusetts, have invented a new and useful Improvement in Ball-Cocks, of which the following is a full, clear, and exact description, reference being had to the accompanying drawings, forming a part of this specification, in explaining its nature.

The invention relates to a ball cock for service boxes of water closets and similar uses, which is especially adapted for use where high water pressures obtain.

It also relates to various features of organization and construction, whereby the friction upon the valve is so slight that comparatively little power or force is required to open and close the same. Consequently a much smaller ball and slighter connecting rod can be used for automatically working the valve than is ordinarily employed.

The invention further relates to means for varying the pressure of the water upon the valve with the idea principally of reducing it.

The invention will be further described in connection with the drawings, in which—

Figure 1 is a view partly in elevation and partly in section of the valve. Fig. 2 is a view in plan of the valve when inverted. Fig. 3 is a detail view.

The casing A of the valve is a casting, preferably of a T-shape; $a$ is the water inlet end of the casing, and $a'$ the outlet. The casing has the contracted section B which extends into the water-way slightly, and which is provided with a screw thread $b$, and there is attached to this contracted section or partial diaphragm, a part C in the nature of a cylinder or quill, closed at one end and open at the other. This cylinder or quill extends into the water-way on the inlet side any desired distance, preferably quite a little, and there are formed one or more holes $c$ in it on the water inlet side of the diaphragm, and preferably near the diaphragm, through which water may flow from the water inlet to the cavity of this valve cylinder. The valve cylinder is preferably enlarged at $c'$ about its open end to form a shoulder to bear against the end $c^2$ of the diaphragm and to also form the stationary valve seat $c^3$ against which the movable valve seat D is adapted to be brought into contact. The valve seat D is preferably made of rubber or any suitable conformable or resilient material. It is held wholly or in part by the sliding head or spindle $d$, and surrounds the tubular section $d'$. The tubular section extends into the cavity or bore of the valve cylinder C. It has the open inner end $d^2$, and it has near the valve seat D one or more holes $d^3$ which form outlet ports. This tubular section slides in the cavity of the valve sleeve C, and is of such length that its outer end moves by or past the ports $c$ in the valve cylinder when the valve is closed and closes them, and at the same time the ports $d^3$ are closed by sliding into the open end of the valve cylinder, and the valve seat D comes into contact with the valve seat $c^3$. The valve D, valve tube $d'$ and spindle $d$ are moved by a ball not shown at the outer end of the rod $e$ the rod being carried by the pivoted spindle moving piece $e'$, which is pivoted at $e^2$ and engages the spindle or head $d$ in the usual way.

To decrease the water pressure I have arranged in the water inlet $a$ an expansible throttle F. This preferably is made of rubber or other expansible material, and is represented as supported by a block $f$, having the flat sides $f'$ (see Fig. 2) and the threaded sections $f^2$ which screw into the interior thread $f^3$ of the casting. The throttle may be secured to this casting, although it is not necessary that it should be, and I have represented it as attached thereto by means of a bolt $f^4$ having a large head $f^5$ to bear against the throttle piece or disk. The shank of the bolt passes through a hole in the throttle piece and through a hole in the holder $f$, and is held in place by a nut $f^6$.

It will be understood that there is a provision for endwise movement of the bolt in the holder. By the use of the nut in the first instance the diameter of the throttle piece may be increased by causing the head of the bolt to bear against the throttle piece with sufficient force. After the valve has been connected with the pipe it is not always convenient to vary the size of the throttle piece by the nut, and to enable this to be conveniently done without detaching the valve I have arranged at the outer end of the valve cylinder an adjusting screw $f^7$, the head of which is in the cavity of the valve cylinder. The point of the screw bears against the head $f^5$ of the bolt, and by turning the screw any desired expanding pressure can be brought upon the throttle F. The head of this adjusting screw is always accessibe because the spindle or head $d$ and valve D and tubular section $d'$ are easily removed from the casing, it only being necessary to remove the pivot $e^2$, and to unscrew the cap G. And when these parts have been removed the head of the adjusting screw can easily be reached by a screw driver inserted through the open end of the valve casing.

The valve casing has the exterior thread $g$ at the inlet end which receives a coupling $g'$. In use the water or fluid from the supply pipe $g'$ enters the inlet section of the valve casing, and its pressure is reduced by means of the throttle, the fluid having to flow, through the restricted or narrow channel between the throttle and the valve casing, and this channel is narrowed or broadened according as the pressure is applied to the throttle or removed from it. The water-way continues by means of the annular passage about the valve cylinder to the ports $c$ and by the open end of the tube $d'$ to the escape ports $d^3$. This of course is upon the supposition that the valve is open. The closing of the valve shuts the ports $c$ $d^3$ and brings the seats D $c^3$ into contact.

The advantages arising from the construction herein specified are first reduction in friction upon the sliding parts of the valve, which enables the valve to be operated with very little power, it being necessary to use for its operation a ball which is relatively very small.

Another advantage arises from the ease with which the water pressure upon the valve may be varied without detaching or removing the valve from its permanent position or any permanent fixed part from it.

I would have it understood that a throttle is principally useful with high pressure and that it can be dispensed with when desired.

The stationary valve seat $c^3$ may be formed upon the diaphragm B, instead of upon the valve cylinder if wished.

I would not confine the use of the cock to water closet valves, as its organization and mode of operation render it generally useful for many other kinds of valves and cocks.

Having thus fully described my invention, I claim and desire to secure by Letters Patent of the United States—

1. A cock for water service boxes and other uses comprising a casing having a water way $a$, an outlet $a'$, the interior threaded section $b$ adjacent to the outlet and the valve head holding extension, the tube C having a screw thread to engage the threaded section $b$ and a cylindrical section extending into the water way $a'$ and also having an enlargement $c'$, the valve seat $c^3$ and one or more ports $c$, and the valve head $d$ having the valve D and the section $d'$ provided with one or more ports $d^3$, as and for the purposes described.

2. The valve casing A and an expansible throttle F held in its water way and adapted to vary the size thereof, as and for the purposes described.

3. The combination in a cock of the throttle support $f$, the throttle F, and the throttle regulating head $f^5$, substantially as described.

4. The arrangement in a cock of the character specified of the expansible throttle F and its adjusting screw $f^7$ carried by a support and having its head in position to be reached by a screw driver or operating device through the open end of the cock, as and for the purposes described.

5. In a cock of the character specified, the valve casing, the valve cylinder C attached to the casing to extend into the water way, an adjustable throttle in the water way and a throttle adjusting screw supported by said valve cylinder, as and for the purposes described.

WILLIAM F. LILL.

Witnesses:
F. F. RAYMOND, 2d,
J. M. DOLAN.